United States Patent [19]

Deishi et al.

[11] Patent Number: 5,729,362
[45] Date of Patent: Mar. 17, 1998

[54] METHOD FOR DETERMINING COLOR DATA

[75] Inventors: Satoshi Deishi, Ibaraki; Hiroshi Goto, Itami, both of Japan

[73] Assignee: Minolta Co., Ltd., Japan

[21] Appl. No.: 499,352

[22] Filed: Jul. 7, 1995

[30] Foreign Application Priority Data

Jul. 7, 1994 [JP] Japan ................................. 6-155844

[51] Int. Cl.⁶ ...................................................... G03F 3/08
[52] U.S. Cl. ........................... 358/520; 358/518; 358/529; 382/162
[58] Field of Search ............................ 358/518, 501, 358/504, 523, 520, 529, 539, 515, 522, 530, 537; 382/167, 162; H04N 1/54

[56] References Cited

U.S. PATENT DOCUMENTS

| | | | |
|---|---|---|---|
| 4,989,079 | 1/1991 | Ito | 358/80 |
| 5,448,379 | 9/1995 | Ishihara et al. | 358/523 |
| 5,463,480 | 10/1995 | MacDonald et al. | 358/518 |
| 5,502,579 | 3/1996 | Kita et al. | 358/520 |
| 5,631,749 | 5/1997 | Ueda | 358/520 |

OTHER PUBLICATIONS

Maureen C. Stone & John C. Beatty; Color Gamut Mapping & The Printing of Digital Color Images, Oct. 1988, pp. 249–292.

*Primary Examiner*—Edward L. Coles, Sr.
*Assistant Examiner*—Madeleine A. Nguyen
*Attorney, Agent, or Firm*—Burns, Doane, Swecker & Mathis, L.L.P.

[57] ABSTRACT

Density data for reproducing an image using the four colors yellow, magenta, cyan and black is based on image data pertaining to chroma, luminosity and hue. The density ratio of two color components, from the three colors yellow, magenta and cyan, is first determined for a given hue. This ratio is then maintained constant while the color value for desired chroma and luminosity is determined. Finally, the density value for black is determined to reproduce a desired color. If the desired color lies outside a reproducible color gamut, a substitute color is chosen which has the same luminosity and hue as the desired color, and the maximum reproducible chroma within the gamut.

14 Claims, 5 Drawing Sheets

Z = 10

Z = 11

Z = 12

Z = 13

| H(°) | YELLOW | MAGENTA | CYAN |
|---|---|---|---|
| −169.49 | 159 | 0 | 256 |
| −137.73 | 83 | 0 | 256 |
| −111.88 | 0 | 0 | 256 |
| −92.61 | 0 | 83 | 256 |
| −67.60 | 0 | 170 | 256 |
| −50.70 | 0 | 256 | 256 |
| −31.94 | 0 | 256 | 163 |
| −13.19 | 0 | 256 | 82 |
| 2.23 | 0 | 256 | 0 |
| 10.58 | 83 | 256 | 0 |
| 18.06 | 159 | 256 | 0 |
| 29.14 | 256 | 256 | 0 |
| 38.93 | 256 | 170 | 0 |
| 69.52 | 256 | 83 | 0 |
| 94.34 | 256 | 8 | 0 |
| 115.97 | 256 | 0 | 82 |
| 139.91 | 256 | 0 | 163 |
| 161.04 | 256 | 0 | 256 |

METHOD FOR DETERMINING COLOR DATA

BACKGROUND OF THE INVENTION

1. Field of the Invention

The present invention relates to a method for creating color density data to reproduce colors from image data obtained by reading a color image in color copiers, color printers and the like.

2. Description of the Related Art

Heretofore, various methods and devices have been proposed for reproducing color images in color copiers, color printers and the like.

In conventional copiers and printers, images are typically reproduced using four coloring materials of yellow (Y), magenta (M), cyan (C), and black (K), respectively. These four primary colors can be combined to reproduce various secondary and tertiary colors by being sequentially overlaid in optional amounts and in optional areas.

To produce an image using these four color components, it is necessary to convert image data obtained by reading a document (e.g., red (R), green (G) and blue (B) image data) into YMCK data in order to reproduce the colors. Conventionally, such conversion to YMCK data has been accomplished by two-stage color conversion wherein image data is converted to three colors YMC, and thereafter black color K data is created by the process of under color removal (UCR).

Methods of converting image data (R, G, B) to YMC are described below. First, primary and secondary matrix conversion methods are described. These methods are based on the principle that a given color is reproduced by passing each overlaid YMC layer through filters. That is, color reproduction is accomplished using the sum of the densities of each layer of the three color overlays.

The next method discussed is the Neugebauer equation calculation method. This method is particularly effective when reproduction is accomplished using halftone dots such as in the case of prints. When halftone prints are enlarged, it is apparent that they comprise collections of small dots of the three primary colors and colors formed by overlays of these three primary colors. The condition of dot overlays arranged at random is stochastically determined, and based on this determination, the color of a reproduction is calculated from the area of the dots reproduced on white paper.

Finally, color reproduction is actually accomplished by various combinations of the three primary colors YMC, a color chart is created based on the color reproduction results, a three-dimensional chart is then created by measuring all color data in the color chart, and colors are determined based on the data of the chart.

There are advantages and disadvantages to each of the aforesaid methods, and none are particularly superior to the others. That is, loss in quality by image enlargement and loss of color tone of reproduced full color images occur due to differences of the aforesaid conversion methods. Further disadvantages arise in the time required for the calculations in the conversion, which depends on the conversion algorithm.

For example, when a matrix conversion method is used, the set-up of a copier or printer is readily accomplished because the method itself is extremely simple. In practice, however, errors in determining colors due to the extreme simplicity of the conversion method cannot be ignored. It is also difficult to adapt such methods to color reproduction using halftones, because the concept is based on color filters.

The Neugebauer method can accomplish conversion based on actually measured values of a given degree, but real-time processing is difficult due to the complexity of the conversion.

Methods which create color charts can accomplish accurate color conversion and processing instantaneously, but require enormous experiments and large capacity memory to store the color charts.

After image data (RGB) is converted to YMC data, under color removal (UCR) is generally accomplished. UCR first extracts the gray component from the YMC data. Color is reproduced using some percentage of the gray component as the black (K) coloring material, and each primary coloring material (YMC) is diminished by that percentage. Thus, UCR is effective in (1) contrast adjustment, (2) neutral correction, (3) expansion of color regions to areas of low luminosity, and (4) economizing on coloring materials used. Black reproduced only by YMC color overlays does not reduce luminosity. Thus, contrast adjustment using black coloring material has a great visual influence and is effective.

Even when UCR is performed, there are areas in which four colors (YMCK) are overlaid. Since these areas have a protruding thickness, the surface of the reproduced image is uneven, causing loss in the quality of the print image.

After image data is converted to YMC data, K data is determined by UCR, and the final density data of the four coloring materials are created in the required two-stage conversion, thus complicating the process for determining the density data of the coloring materials.

As previously mentioned, conventional methods are disadvantageous in that the processing to obtain density data of coloring materials cannot be simply and rapidly accomplished, and the resulting reproduced image cannot be accurately rendered in the printed image.

SUMMARY OF THE INVENTION

An object of the present invention is to provide a method for determining density data of coloring materials which eliminates the previously described disadvantages.

Another object of the present invention is to provide a method for determining density data capable of deriving density data of coloring materials used in image reproduction from image data in a simple manner.

A further object of the present invention is to provide a method for determining density data of coloring materials capable of reproducing an excellent print image by minimizing the amount of overlaid coloring materials.

A still further object of the present invention is to provide a method for accurately determining density data using minimum memory.

These and other objects are attained by a method for determining density data for each of the four colors yellow (Y), magenta (M), cyan (C), and black (K), based on image data representing chroma, luminosity, and hue, to reproduce a color image using yellow (Y), magenta (M), cyan (C), and black (K) as coloring materials. The method for determining density data of coloring materials determines the density ratio of two coloring materials from Y, M and C corresponding to a given hue, maintains the density ratio of the two determined coloring materials corresponding to chroma and luminosity, and determines the density data for the two coloring materials and the density data for black (K).

The aforesaid objects are attained by a method wherein density data for black (K) and density data for a single coloring material corresponding to chroma and luminosity are determined when hue is reproduced by a single coloring material among YMC.

The aforesaid objects are attained by determining density data of coloring materials by using as substitute colors image data having maximum reproducible chroma among colors having identical luminosity and hue to relative image data which are not included in a reproducible color space.

BRIEF DESCRIPTION OF THE DRAWINGS

These and other objects and features of the present invention will become apparent from the following description of the preferred embodiments thereof taken in conjunction with the accompanying drawings, in which.

In the following description, like parts are designated by like reference numbers throughout the several drawings.

DETAILED DESCRIPTION OF THE PREFERRED EMBODIMENT

The preferred embodiment of the present invention is described hereinafter with reference to the accompanying drawings.

Figure 1:
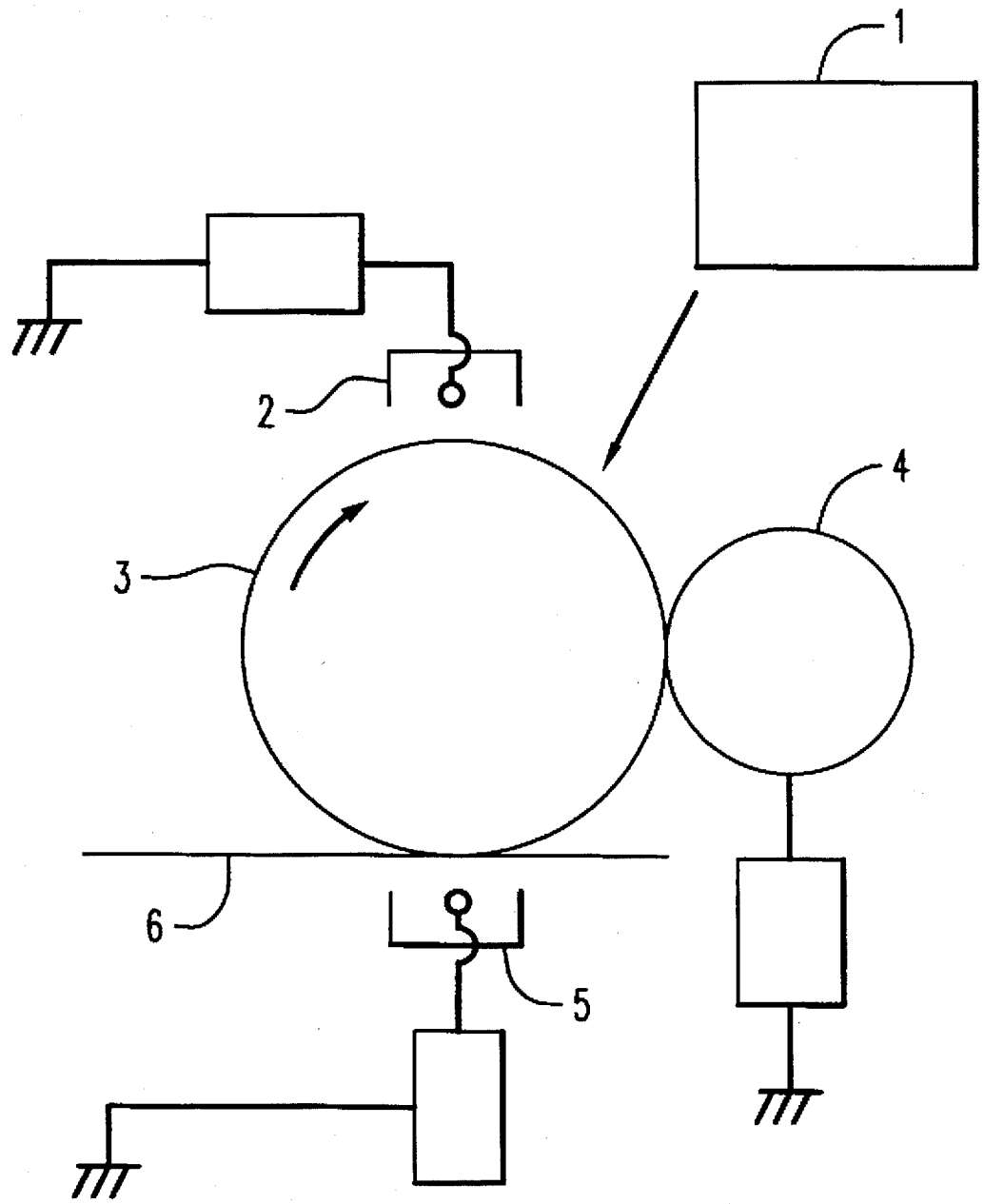
FIG. 1 is a brief illustration of a printer using the present invention.

FIG. 1 shows a printer that uses the present invention. The printer comprises scanning optical system 1, photosensitive drum 3, charger 2, developing device 4, and transfer device 5. Photosensitive drum 3 rotates at a constant speed in the direction indicated by the arrow in the drawing, and the surface of the drum is uniformly charged to a predetermined potential by charger 2. An electrostatic latent image is formed on the surface of the charged photosensitive drum 3 by scanning it with a laser beam emitted from optical scanning system 1. Thereafter, the electrostatic latent image is developed into a toner image by developing device 4 so as to be rendered visible. Then, the developed toner image is transferred onto a recording sheet 6 of paper or the like by transfer device 5 at a transfer station, and the transferred toner image is fixed to the sheet 6 by a fixing device (not shown in the drawing).

Figure 2:
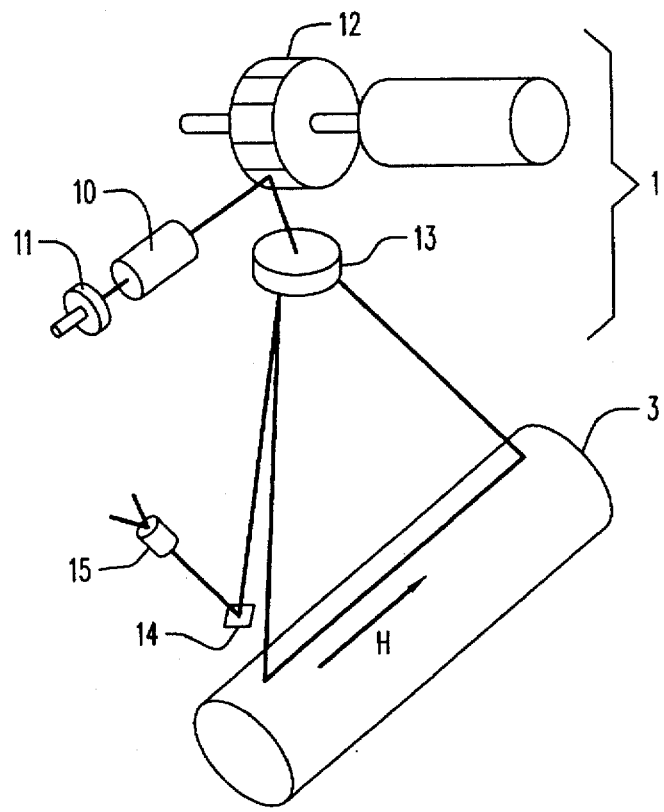
FIG. 2 is a brief illustration showing details of a scanning optical system.

FIG. 2 shows the optical scanning system 1. Semiconductor laser 11 emits a laser beam modulated in accordance with image data read from an image memory or the like in a control section (not illustrated). The emitted laser beam is collimated by collimator lens 10, and deflected by polygonal mirror 12. The deflected laser beam forms an image on the surface of photosensitive drum 3 via f-θ lens 13 as it scans the surface of photosensitive drum 3 at uniform speed. During this scanning, the leading edge of a single line scan of the laser beam is reflected by mirror 14, and the reflected beam is directed to photosensor 15, which produces a detection signal that is used as a synchronization signal for the scan in the horizontal direction H.

Figure 3:
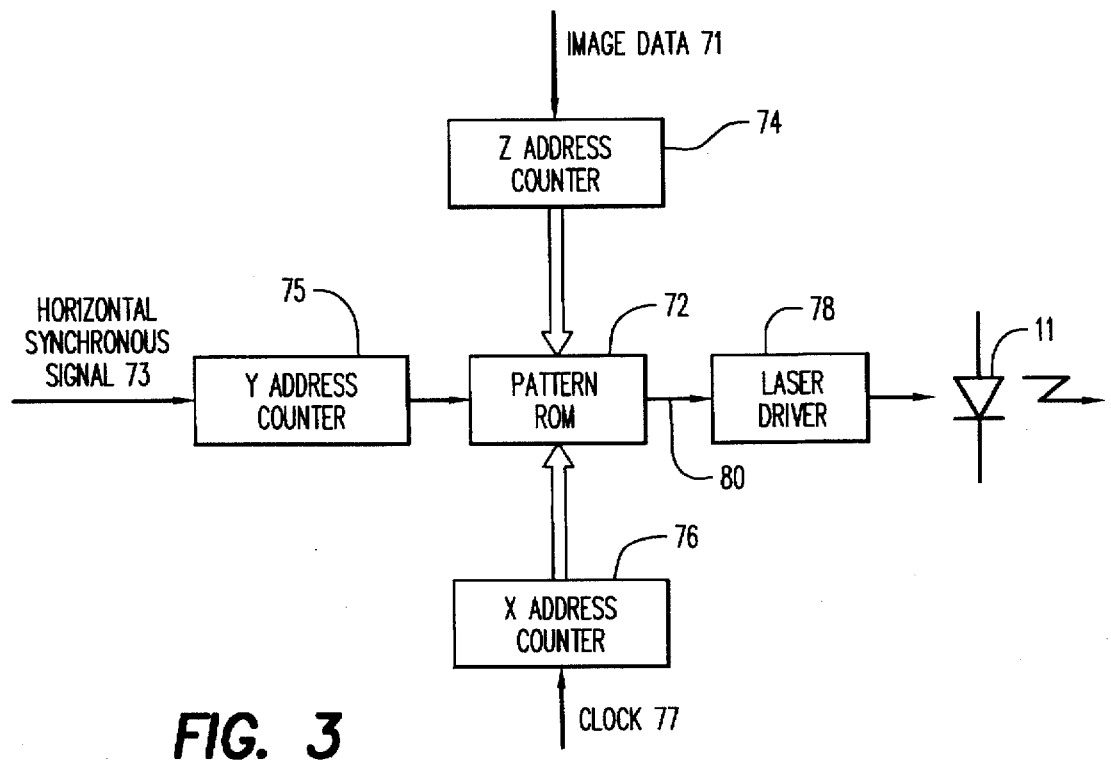
FIG. 3 is a block diagram showing the drive circuit of a semiconductor laser.
Figure 4A:
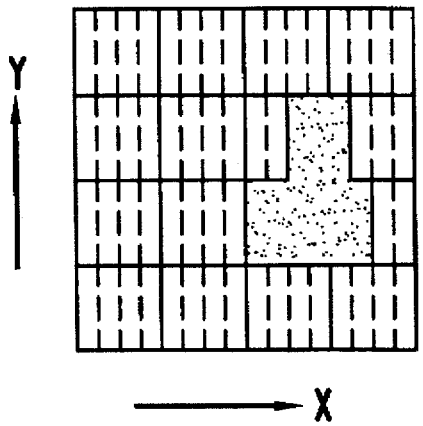
FIG. 4 is an illustration showing examples of threshold value matrix.
Figure 4B:
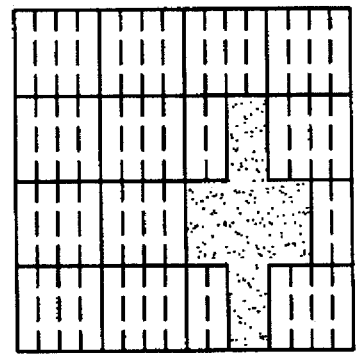
Figure 4C:
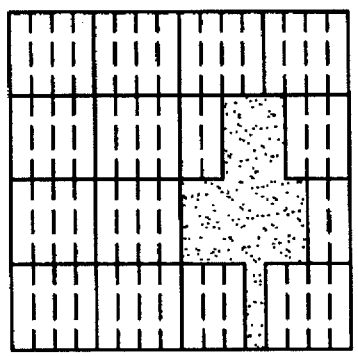
Figure 4D:
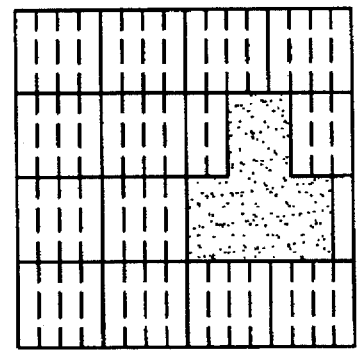

FIG. 3 is a block diagram of the modulation circuit for modulating semiconductor laser 11. In the present embodiment, one picture element is divided into 4×4 blocks, and laser exposure is accomplished via four-level pulse modulation relative to each block.

Reference number 72 refers to a pattern ROM (read only memory) for storing exposure patterns describing which blocks are to be exposed within a single picture element. Laser exposure is accomplished based on the exposure pattern selected by Z address counter 74 corresponding to coloring material density data 71. That is, exposure data corresponding to each block of a selected exposure pattern is read by a signal from Y address counter 75, corresponding to horizontal synchronization signal 73, and a signal from X address counter 76, corresponding to picture element clock 77. Laser driver 78 controls the oscillation of semiconductor laser 11 based on this exposure data.

The image density data 71 comprises digital signals made up of 6-bit density data (64 gradations). Sixty-four types of patterns corresponding to the 64 gradations are used as exposure patterns stored in the pattern ROM.

Accordingly, when color material density data read from an image comprises 8-bit data (256 gradations), it must be converted to data of 64 gradations. Alternatively, density image data 71 may be handled as 8-bit data, and the exposure patterns stored in the pattern ROM may be increased.

When full color images are reproduced using a plurality of YMCK coloring materials, various exposure patterns corresponding to the various colors YMCK may be stored beforehand in pattern ROM 72, and these exposure patterns may be selectively used for each color. Moire phenomenon can be avoided by changing the screen angle of each exposure pattern YMCK, and changing the screen resolution of each color. If only the K screen resolution is increased, the reproduced image produces a smooth print image.

For example, reproduction may be accomplished by setting the screen angles at Y=0°, M=15°, C=75°, and K=45°; and by setting the screen resolution for K at 170 lines, and YMC at 150 lines.

FIG. 4 shows examples of exposure patterns stored in the pattern ROM 72. These examples correspond to areas equivalent to low density regions. In the cases of Z=11, Z=12 and Z=13, the total exposure times are identical, but the exposure positions are different. Ultimately, reproduction density differs due to differences in exposure position, with the result that gradations can be maintained. It will be appreciated that other exposure patterns can be employed, in dependence upon the desired visual effect and the capabilities of the scanning and laser systems.

The specific method for determining density data for each YMCK coloring element, based on image data representing chroma, luminosity, and hue, is described below. Image data is typically RGB data. Therefore, the RGB data must first be converted to LCH data. This conversion may be accomplished by well known methods stipulated by CIE, and is therefore omitted from the present discussion.

Figures 5, 6:
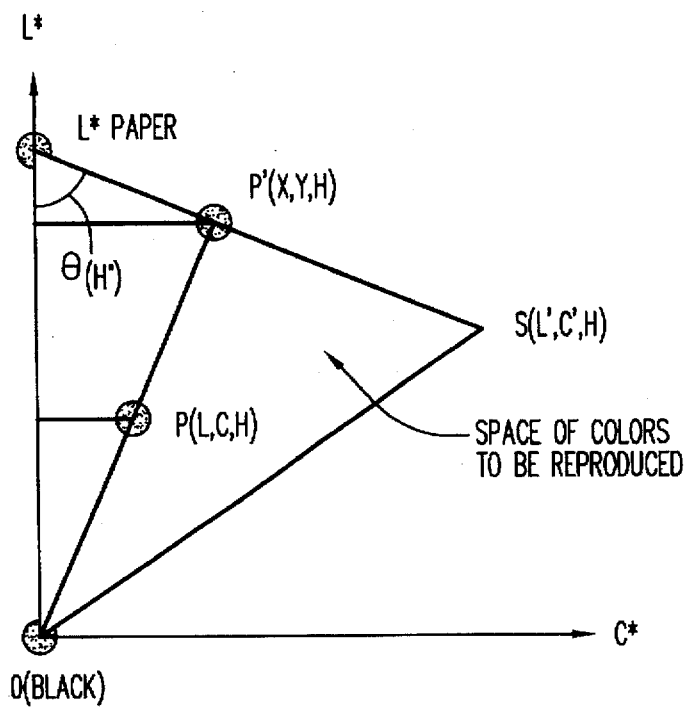
FIG. 5 is an illustration of a color space.
FIG. 6 shows the relationship between hue and coloring material.

FIG. 5 shows a cross section of a Munsell color space (L*C*H coordinate system) at a given single hue (H). The vertical axis in FIG. 5 represent luminosity (L*), and the horizontal axis represents chroma (C*). In the drawing, origin point O represents a solid black color, and the apex L*paper corresponds to the color of a blank white paper sheet. The area circumscribed by the triangle OLS in the drawing represents the area of reproducible color, i.e. the color gamut for the image reproducing device of interest. This area is naturally determined by the characteristics of the color material used, e.g. inks or toners. Point S (L', C', H) on the right side is the point of greatest chroma for the given hue (H), and is also determined by the characteristics of the color materials used. A description of point S of greatest chroma follows.

FIG. 6 shows the relationship between hue and the mixture amount of YMC coloring materials for reproducing this hue, relative to the point S of greatest chroma. The point of greatest chroma in all hues can be reproduced by using one, or at the most two, coloring materials from the three primary colors YMC. This can be understood from the fact that when the three colors YMC are combined, achromatic color results.

Points on the line connecting the aforesaid points S and L*paper are also reproducible, since a white sheet is used, by suitably changing the composition ratio and composition amounts shown in FIG. 6.

In the drawing, point P (L, C, H) is a designated point within the color space for a particular color value to be determined. To determine the YMCK density to reproduce the color value at point P, first the YMC density of point S is determined. The previously mentioned FIG. 6 is stored beforehand in a ROM or the like as a table, and YMC density corresponding to hue (H) is determined from this table. Then, the YMC density of point P' (X, Y, H) is determined. Point P' is the intersection of (a) the extended straight line connecting the origin point O and point P, and (b) the straight line connecting point S of greatest chroma and white color point L*paper. The coordinates (X, Y) of point P' (X, Y, H) are derived by the following equation.

$$X = L*paper \times \tan \theta H / (C/L + \tan \theta H)$$

$$Y = C/L \times L*paper \times \tan \theta H / (C/L + \tan \theta H)$$

Where L*paper is the lightness of the paper that is used.

Point P' determined as described above is for the given hue (H). Since point P' is on the straight line connecting point S of greatest chroma and white color point L*paper, the point can be reproduced by using one or two coloring materials from the colors YMC, as previously described.

The YMC density of point P' can be determined at Y/C' (the YMC density of point S). At this time, point P' is expressed by the density of two colors from among the three colors YMC excluding K. When coloring material K is added as an optional color, it is understood that the color within the same hue changes linearly toward origin point O. The density of K is determined in consideration of the aforesaid characteristic. The density of K can be determined by interpolation, e.g. 256* (1-L/X) from the equivalent proportions of P'P relative to line segment P'O. When reproducing by an area gradation method, errors due to color fluctuation are particularly few.

Thus, only one or two coloring materials from Y, M and C are used with K to reproduce the determined point P. However, K is not used when point P is on the line connecting the point of greatest chromas and the white color point L*paper. That is, the four colors YMCK are not overlaid on the paper.

Figure 7:
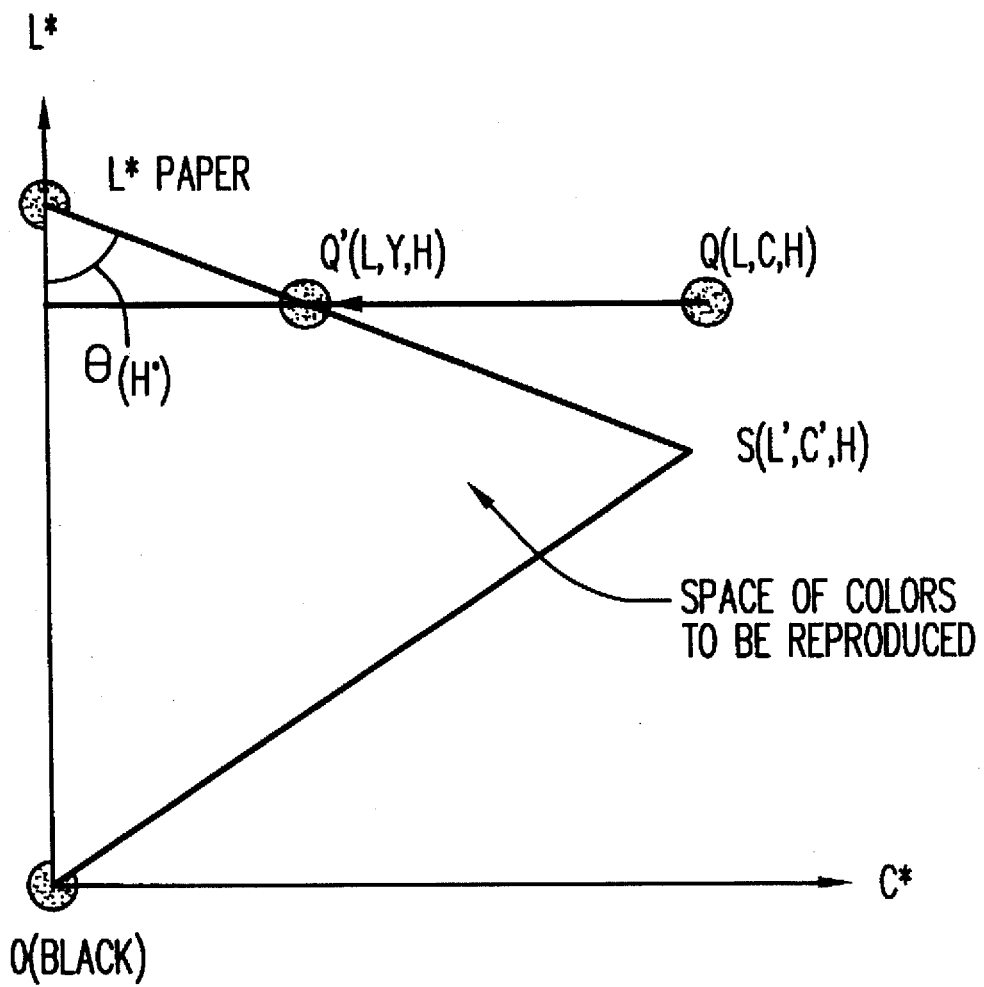
FIG. 7 is an illustration showing a color space when a determined color is a non-reproducible color.

The situation when a designated color Q is an unreproducible color, i.e., when the designated color is not in the reproducible color gamut circumscribed by the triangle, is described hereinafter with reference to FIG. 7. In FIG. 7, chroma (C) is adjusted while maintaining luminosity (L) and hue (H) constant, to determine a point Q' which intersects either the line connecting white color point L*paper and point S of greatest chroma, or the line connecting origin point O and point S of greatest chroma. Point Q' is selected as the nearest reproducible color to the designated color Q.

Accordingly, when point Q' is on the line connecting point L*paper and point S, the density ratio of two coloring materials among YMC corresponding to hue are determined, and thereafter this density ratio is maintained while the density quantity (data) is adjusted to obtain density data of the coloring material corresponding to objective point Q'. In the case where hue is represented by one coloring material from among the three colors YMC, the density quantity for that one coloring material is adjusted so as to obtain density data of the coloring material corresponding to objective point Q'. Thus, K is not used in this computation.

On the other hand, when point Q' is on the line connecting origin point O and point S, the density quantity of two coloring materials among YMC corresponding to hue are determined, and thereafter this density quantity is maintained while the density of K is adjusted, so as to determine the density data of the coloring material corresponding to objective point Q'. Then, the density of K added to the density of one of the aforesaid coloring materials is adjusted in the same manner as when hue is represented by one coloring material from among the three colors YMC, so as to obtain density data of the coloring material corresponding to objective point Q'.

Although the present invention has been described in terms of color printers using electrophotography, it is to be understood that the method of the present invention can be used in other printing apparatus which use digital data (e.g., silver salt type printers, sublimation type printers, thermal transfer type printers, inkjet type printers and the like).

The present invention is adaptable for use in devices using an area gradation method (e.g., typical dithering methods), devices using variable gradation methods via intensity modulation, as well as devices using gradation methods via area gradation and intensity modulation.

The method for determining density data of coloring material of the present invention basically accomplishes image reproduction with three colors, including K, among the colors YMCK, thereby minimizing running costs. Since density data of coloring materials are accurately determined to reproduce images with three colors, the tone of the reproduced image is extremely accurate. The surface of the reproduced image is flat, thereby providing excellent printed images in both look and feel. When an image is reproduced by transferring coloring materials, the amounts of coloring materials to be transferred are very small, such that transfer conditions can be easily set, and the operating costs of the device are reduced.

The present invention simplifies processing insofar as UCR is rendered unnecessary, and conventional two-stage color conversion processing is accomplished in one stage. Overall processing time is less than that of conventional methods because black (K) processing is also accomplished by simple proportional computation. Accordingly, real-time conversion processing is possible.

Furthermore, the present invention effectively achieves cost reduction by minimizing the amount of array memory, and because hue can be processed by a unidimensional look-up table (LUT). On the other hand, the reproducible color range is enlarged as a result of positive utilization of K, which is particularly effective in expressing chroma regardless of the lack of UCR.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method for reproducing a color image using coloring materials of yellow (Y), magenta (M), cyan (C), and black (K) based on image data representing chroma, luminosity, and hue, comprising the steps of:

determining a density ratio of at most two coloring materials among YMC corresponding to a given hue;

determining density data for each of said two coloring materials and a density data for black (K) corresponding to chroma and luminosity on the condition that said density ratio of two determined coloring materials is maintained constant; and generating a color image with said coloring materials using the density data for each of said two color materials and the density data for black.

2. The method of claim 1, further comprising the step of:

determining a substitute color when said image data is outside of a reproducible color gamut which is defined by the coloring materials.

3. The method of claim 2 wherein the step of determining a substitute color comprises the steps of:

determining chroma, luminosity and hue values for a desired color which is outside of the reproducible color gamut;

maintaining said luminosity and hue values constant; and selecting the maximum reproducible chroma value in said color gamut at said luminosity and hue values.

4. The method of claim 1, wherein the color image is reproduced on a white paper.

5. An apparatus which reproduces a color image based on image data representing chroma, luminosity, and hue using yellow (Y), magenta (M), cyan (C) and black (K) as coloring materials, comprising:

a first means for determining a density ratio of two coloring materials from among the three colors YMC, corresponding to a given hue;

a second means for determining density data for each of said two coloring materials and density data for black (K) corresponding to chroma and luminosity on condition that the density ratio of said two determined coloring materials is maintained constant; and a reproducing means for reproducing a color image based on said density data of said two coloring materials and black.

6. The apparatus of claim 5, wherein the color image is reproduced on a white paper.

7. The apparatus of claim 5, wherein the first means includes a memory which stores relationships between two coloring materials from among the three colors YMC for given respective hue values.

8. An apparatus which reproduces a color image based on image data representing chroma, luminosity, and hue using yellow (Y), magenta (M), cyan (C) and black (K) coloring materials which define a reproducible color gamut for said apparatus, comprising:

means for determining chroma, luminosity and hue values for a desired color in an image;

means for detecting whether the combination of said determined values is contained within said color gamut;

means for selecting the maximum reproducible chroma value in said color gamut while maintaining said luminosity and hue values constant, to derive a substitute reproducible color when said combination of determined values is detected not to be contained within said gamut;

means for determining a density value for at most two coloring materials from among the three colors YMC, corresponding to said determined hue;

means for determining density data for each of said at most two coloring materials and density data for black (K) corresponding to the selected chroma and the determined luminosity on condition that relative density values of said coloring materials are maintained constant; and a reproducing means for reproducing a color image based on said density data of said at most two coloring materials and black.

9. A method for reproducing a color image using coloring materials of yellow (Y), magenta (M), cyan (C), and black (K) based on image data representing chroma, luminosity, and hue, comprising the steps of:

determining a density value for one coloring material from among YMC, corresponding to a given hue;

determining density data for black (K) corresponding to chroma and luminosity on the condition that said density value for said one coloring material is maintained constant; and generating a color image with said coloring materials using the density value for said one color material and the density data for black.

10. An apparatus which reproduces a color image based on image data representing chroma, luminosity, and hue using yellow (Y), magenta (M), cyan (C) and black (K) as coloring materials, comprising:

a first means for determining a density value for one coloring material from among the three colors YMC, corresponding to a given hue;

a second means for determining density data for black (K) corresponding to chroma and luminosity on the condition that the density value for said one coloring material is maintained constant; and a reproducing means for reproducing a color image based on said density value for said one coloring material and the density data for black.

11. An apparatus for processing a color image based on image data representing chroma, luminosity, and hue using yellow (Y), magenta (M), cyan (C) and black (K) color components, comprising:

a first means for determining a density ratio of two color components from among the three colors YMC, corresponding to a given hue;

a second means for determining density data for each of said two color components and density data for black (K) corresponding to chroma and luminosity on the condition that the density ratio of said two determined color components is maintained constant; and means for generating a signal indicative of said determined density data for said two color components and black.

12. The apparatus of claim 11, further including means for determining a substitute color when image data is outside of a reproducible color gamut which is defined by said color components.

13. The apparatus of claim 11 wherein said density data is determined with reference to the reproduction of the color image on a white recording medium.

14. An apparatus for processing a color image based on image data representing chroma, luminosity, and hue using yellow (Y), magenta (M), cyan (C) and black (K) as color components, comprising:

a first means for determining a density value for one color component from among the three colors YMC, corresponding to a given hue;

a second means for determining density data for said one color component and density data for black (K) corresponding to chroma and luminosity on the condition that the density value for said one color component is maintained constant; and means for generating a signal indicative of said determined density data for said one color component and black.

* * * * *